Nov. 14, 1967 K. BASSETT 3,353,045
METHOD AND MEANS FOR PRODUCING MOTION REDUCTION
Filed May 7, 1964 3 Sheets-Sheet 1
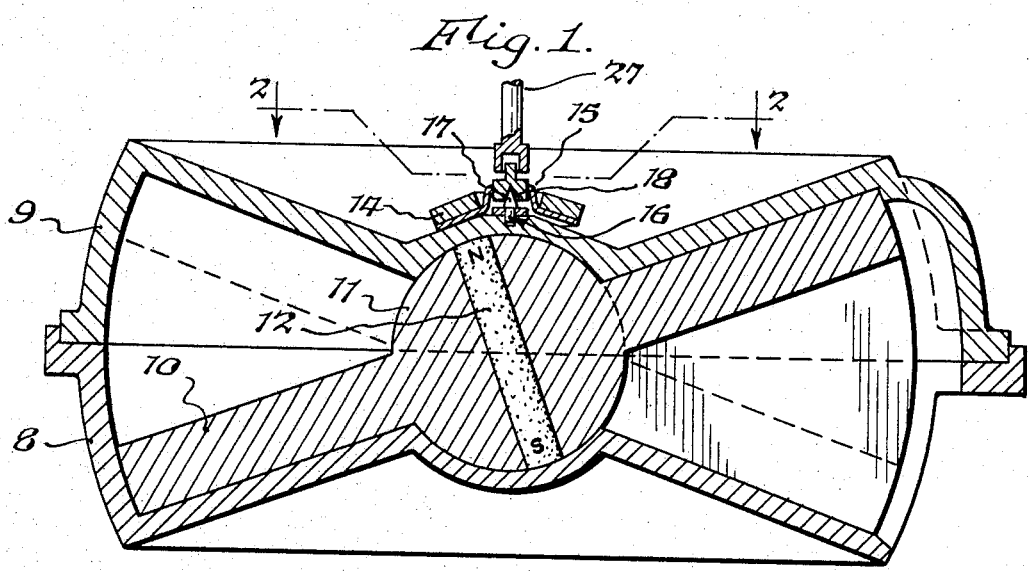
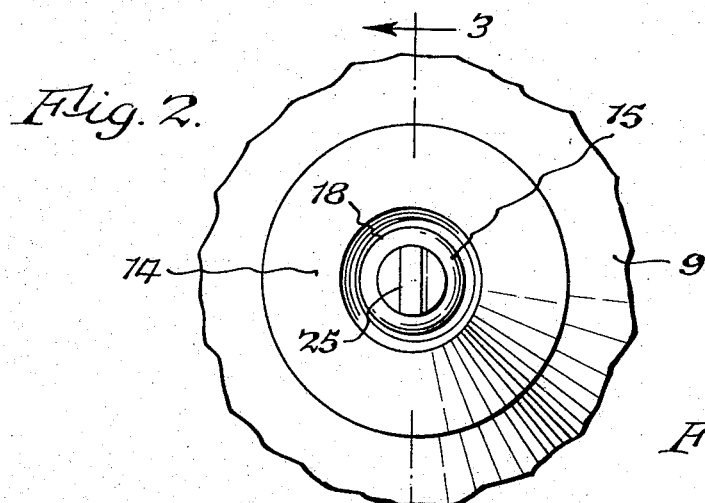
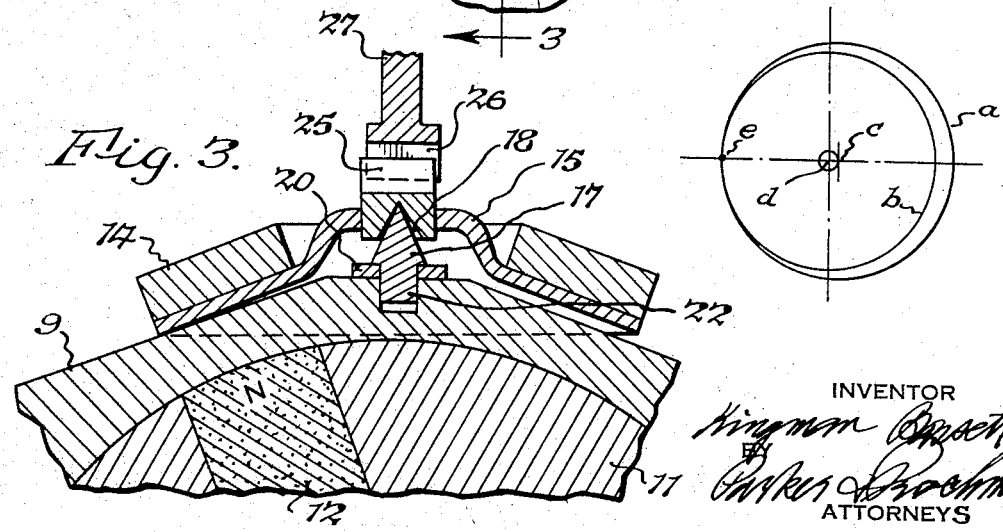
INVENTOR
Kingman Bassett
ATTORNEYS Nov. 14, 1967   K. BASSETT   3,353,045
METHOD AND MEANS FOR PRODUCING MOTION REDUCTION
Filed May 7, 1964   3 Sheets-Sheet 2

INVENTOR
Kingman Bassett
Parkes & Nelson
ATTORNEYS

Nov. 14, 1967     K. BASSETT     3,353,045
METHOD AND MEANS FOR PRODUCING MOTION REDUCTION
Filed May 7, 1964     3 Sheets-Sheet 3
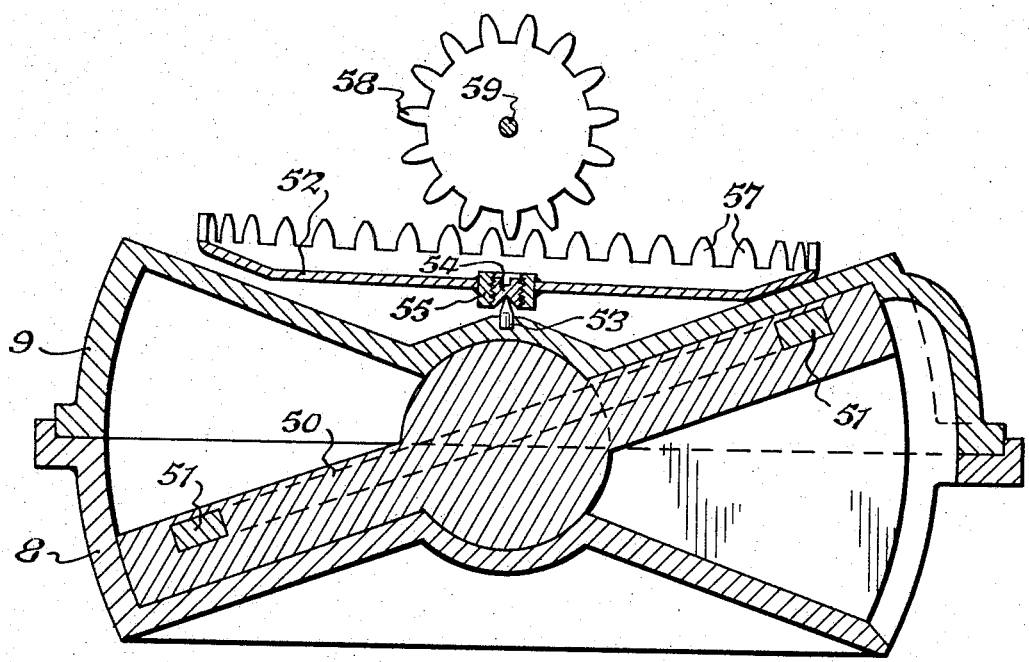
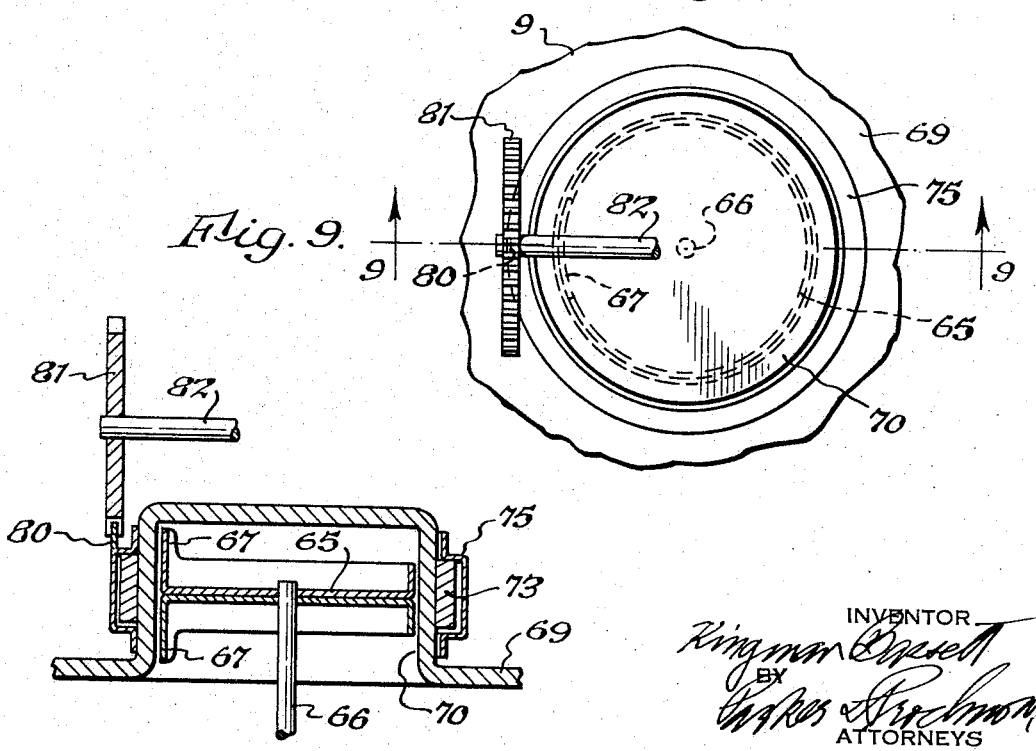

UNITED STATES PATENT OFFICE 3,353,045
Patented Nov. 14, 1967

3,353,045
METHOD AND MEANS FOR PRODUCING
MOTION REDUCTION
Kingman Bassett, 188 Soldiers Place,
Buffalo, N.Y. 14222
Filed May 7, 1964, Ser. No. 365,729
11 Claims. (Cl. 310—104)

This invention relates to methods and devices for producing motion reduction ratios between a driving and driven member.

It is well known that when a member freely nutates about an axis in contact with a fixed surface, the member will also rotate about its axis of nutation and the number of rotations is less than the number of nutations of the member.

One object of the invention is to transfer the nutation of a member to another nutating member and to separate the rotation of the second nutating member from its nutation.

Another object of the invention is to transmute the rotation of a member into the nutation of another member and to separate the rotation of the second member from its nutation.

A further object is to transmit the motion of a driving member magnetically through an imperforate wall or surface to a driven nutating member to produce limited rotation of the driven member.

A further object is to provide means for varying the ratio between the number of nutations of the nutating member and the number of revoltuions produced thereby.

In the accompanying drawings:

FIG. 1 is a vertical, sectional view of a fluid meter having a disk which is nutated by the flow of fluid and including a mechanism embodying my invention for transmitting rotations in a ratio to the nutations of said nutating disk.

FIG. 2 is a fragmentary, top plan view thereof taken approximately on the line 2—2, FIG. 1.

FIG. 3 is a fragmentary, vertical sectional view thereof showing on a larger scale and in slightly different positions the parts shown in FIG. 1.

FIG. 4 is a diagrammatic view showing the circle of contact generated on a nutating driven disk and the circle of contact generated on a fixed surface upon which it rolls.

FIG. 7 is a vertical, sectional view of another modified construction showing a different drive.

FIG. 8 is a top plan view of a motion reduction mechanism of another modified construction.

FIG. 9 is a central sectional elevation thereof on line 9—9, FIG. 8.

Figure 5:
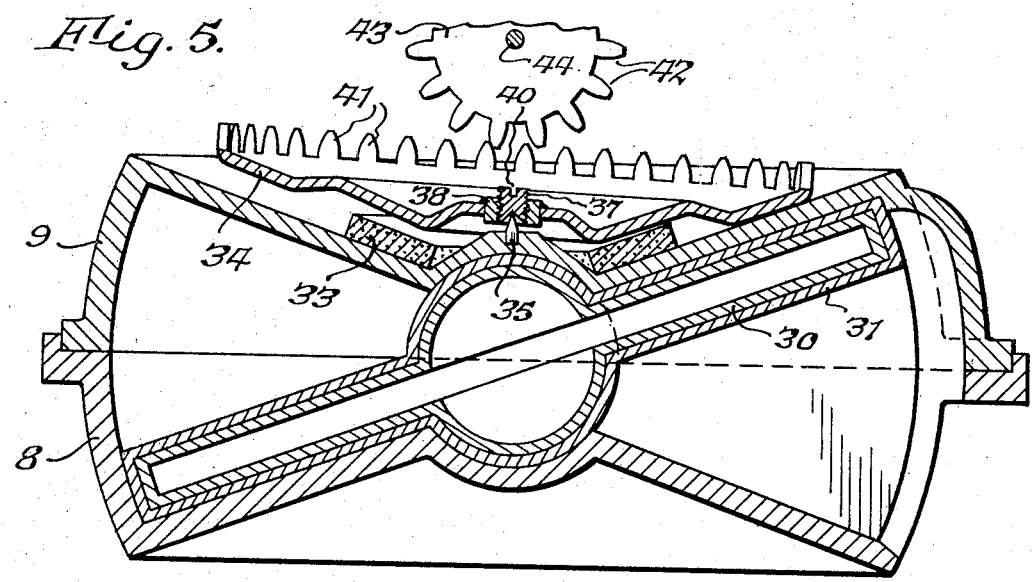
FIG. 5 is a vertical, sectional view of a modified construction showing a different driving mechanism and the transmission of rotation from the driven nutating disk to a gear.

I have shown in FIG. 1 my improvements as employed in connection with a fluid meter having an outer housing formed in two parts 8 and 9 secured together in leak-proof relation. In FIG. 1, a piston 10 is arranged in the housing. This piston is in the form of a disk which is nutated by the flow of fluid through the housing, as is well known in meter constructions. When used in connection with my improved mechanism, the upper half 9 of the meter housing is made of a non-magnetic material. It is not intended however to limit my improvement for use in connection with fluid meters since it is obvious that my improvements may be employed in connection with driving members which are moved by other means than fluid. The piston also hase a spherical body 11 which acts as a pivot for the piston member 10.

In nutating disk fluid meters as heretofore constructed, the spherical body 11 has a pin extending out of the socket in which the spherical body rides. This pin rides against a cam or roller in such a manner as to maintain the angle of nutation in order to keep the disk face against the conical face of the measuring chamber so as to minimize leakage of fluid around the piston member 10. This construction necessitates the precise location of the cam or roller, and also the friction produced by this construction interferes to some extent with the accuracy of the meter. It is consequently an object of this construction to maintain the angle of nutation by magnetic means.

In prior nutating disk fluid meters there are also present one or more of the following elements: a driver block with which the aforementioned pin cooperates, an intermediate gear train outside the meter housing or within the meter housing and immersed in the fluid passing through the meter, a 1:1 ratio magnetic drive operating through the meter housing or a shaft passing through the meter housing which may develop leaks, and a set of change gears for adjusting the reduction ratios. It is among the purposes of my invention to eliminate all of these parts by my improved method and mechanism.

In order to accomplish the aforementioned purposes of this invention and others, I transmit motion from the nutating piston through the piston housing by magnetism, and for this purpose, in the construction shown in FIGS. 1–3, I have provided a permanent magnet 12 in the spherical part 11 of the piston. This magnet may be of any suitable or desired type, for example, a bar magnet having poles at opposite ends thereof and extending diametrically through the spherical part 11 of the piston. This magnet cooperates with another magnet 14 arranged on the exterior of the housing and mounted on a driven member 15 which is supported by a pivot 16, such as a pointed member 17 extending into a socket 18, the socket fitting loosely about the pointed pivot member 17 so that the driven member 15 is free to nutate and rotate about the pivot.

The driven member 15 is mounted to contact at a radius from the pivot point 17 with the outer surface of the piston housing 9 or other fixed surface in such a manner that the driven member 15 will nutate in synchronism with the nutation of the piston 10.

It will be noted by inspection of FIG. 3 that as the driven member 15 is nutated, the line of contact between the driven member 15 and the upper half 9 of the housing will generate a circle, and at each nutation of the driven member 15, this member will rotate through a small fractional part of the circle of contact, between the driven member and the housing 9, and this small movement is in a direct ratio to the nutating motion of the piston 10. It will also be noted that this circle of contact will depend upon the height of the driven member above the housing or contact member 9. If the pivot point 17 is close to the housing or contact member 9, a larger number of nutations of the driven member will be required to complete a circle or rotation, and if the pivot point 17 is located at a greater elevation, thus separating the driven member 15 to a greater extent from the housing or contact member 9, a smaller number of nutations of the piston 10 and the driven member 15 will be required to complete a circle or rotation made by the driven member 15. In order to obtain the desired ratio of rotation of the driven member 15 to the nutations of the piston 10, disks 20 of varying thickness may be provided so as to raise the driven member 15 to the desired extent above the contact member 9. The driven member 15 may of course be nutated by any other suitable means than a meter piston.

In the construction shown for this purpose, the pointed pivot member 17 is provided with an outwardly extending shoulder formed to rest on the spacing disk 20, and the pivot member also has a stem 22 extending through the disk 20 and into a hole in the upper housing member 9 of the meter so that the pivot member 17 can be readily adjusted to the desired heights to produce the ratio desired between the rotation and nutation of the driven member by providing disks of different thickness.

In FIG. 4 I have illustrated diagrammatically a circle $a$ which represents the size of the circular path of the line of contact between the driven member 15 and contact member 9 as is generated on the lower surface of the driven member 15 by the nutation of driven member 15. Circle $b$ represents the size of the same circular path of the line of contact as generated on the upper surface of contact member 9. The circle $b$ is smaller than $a$ and is therefore a shorter lineal distance than the lineal distance around the circle $a$. Consequently one nutation of the driven member 15 generates a complete circle of the path of contact on the surface of contact member 9 but does not generate a complete circle of the path of contact on the surface of driven member 15. This uncompleted increment represents the ratio of rotation to nutation of driven member 15. Any adjustment of the size of circle $a$ or circle $b$ relative to each other will cause a change in the portion of circle $a$ which is uncompleted and thus vary the ratio of rotation to nutation driven member 15. $c$ represents the center of circle $a$ and $d$ is the center of circle $b$. The cycle from the time circle $a$ is in contact with circle $b$ at point $e$ until the circles are again in contact at point $e$ represents one nutation of the driven member 15. The cycle from the time a fixed point on circle $a$ is in contact with circle $b$ at point $e$ until this same point on circle $a$ passes over point $e$ again represents one rotation of driven member 15. It is not intended to limit my improvements to mechanism wherein the path of contact generated on the nutating member is always larger than the path of contact generated on the fixed member since it is obvious that my improvements can be employed in mechanisms wherein the path of contact generated on the nutating member is smaller than the path of contact generated on the fixed member. It is not intended to limit my improvements to mechanism wherein the path of contact generated on the nutating member and the path of contact generated on the fixed member are of frusto conical shape since it is obvious my improvements can be employed in mechanisms wherein the paths of contact are of other generally circular shapes.

The rotation of the driven member may be transmitted from this member in any suitable or desired manner, and in the construction shown for this purpose I have provided the socket-carrying member at the upper end thereof with a transversely extending flat head or blade 25 formed to extend into a transverse slot 26 formed in the head of a rotatable pin or shaft 27. As a result of this construction the pin 27 will rotate about a fixed axis and can be connected with any suitable recording or indicating device (not shown), such as heretofore employed in meters.

In the particular construction shown, I have indicated a bipolar bar magnet 12 in the nuating piston 10, and the magnet 14 may be of the type magnetized along its axis so that, for example, the lower face of this magnet may be a south pole to cooperate with the north pole of the magnet 12. However, the magnetic circuit may be produced in other ways. For example, in place of either magnet 12 or 14, one magnet may be replaced by a soft iron part. Greater magnetic force will of course be exerted by means of the construction shown.

From the foregoing it will be obvious that the nutation of the piston 10 through the magnet 12 will produce nutation of the driven member 15. This nutation will be accompanied by a rotation of the driven member which will be very slight in comparison with the nutation. However, this slight rotation will be transmitted in the spindle or pin 27 which is connected with a suitable recording or indicating device. It will thus be seen that motion can be transmitted from the piston through the non-magnetic housing member 9 to the driven member 15 without requiring any perforation or bearing through the housing member 9.

The successful and accurate operation of this transmission mechanism depends upon a good contact between the driven member and the surface of the housing member 9 with which it cooperates. The magnetic action helps to provide such firm contact, in that the magnet in the piston will draw the driven member into engagement with the contacting surface of the upper housing member 9.

Figure 6:
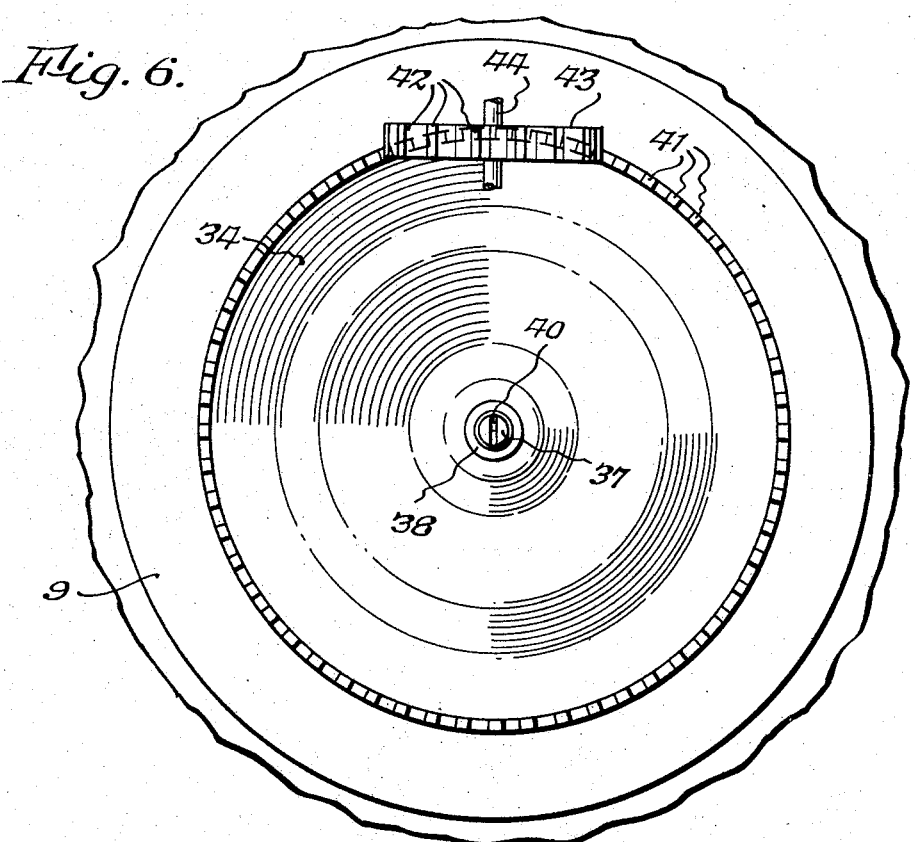
FIG. 6 is a fragmentary, top plan view of the construction shown in FIG. 5.

In the modified construction shown in FIGS. 5 and 6, a piston 30 of hollow form is provided which may be of soft steel and which is covered with a suitable coating 31, for example, by means of a plastic material which has resistance to corrosion by the fluid which is being metered, and the coating also serves to reduce friction between the piston and the housing.

A magnet 33 is provided on the outer face of the housing member 9 and is stationary. The driven member 34 is arranged above the magnet and, as in the construction shown in FIGS. 1–3, formed so that it contacts the upper surface of the housing 9 at a radius from the axis of the pivot.

This half housing is provided with an upwardly extending pivot pin 35 secured thereto and cooperating with a socket member 37 having a screw threaded connection with a bushing 38 secured to the driven member and internally threaded to cooperate with the external threads of socket 37. This permits the bushing 38 and the driven member 34 to be adjusted relatively to the socket member 37 for determining the height of the driven member 34 with reference to the contact surface of the upper half of the housing 9. To facilitate this adjustment, the socket member 37 may be provided with a slot 40 for a screwdriver or other suitable means to permit turning of the socket to set it in the desired position.

The driven member is dished so that its middle portion will clear the magnet 33 and is made of steel or other magnetic material and provided on its upper face with one or more gear teeth 41 positioned to cooperate with gear teeth 42 formed on a disk 43. This disk is connected with suitable mechanism (not shown) including a pinion and shaft 44 for recording or indicating the revolutions. The teeth 42 and 41 interfit loosely so that the desired transmission from the one to the other can be effected, since the small vertical and horizontal components of the motion of the teeth on the driven member require such loose fit.

In the construction shown in FIGS. 5 and 6, the lines of force from the magnet 33 will pass through a comparatively short path from the magnet through the half housing 9 to the steel piston 30 and the driven member 34. In this manner a strong magnetic force serves to ensure a positive drive of the driven member. If the driven member is provided with a single tooth, the gear 43 will be advanced only one tooth during complete rotation of the driven member 34.

In the modified construction shown in FIG. 7, a piston 50 is provided with a magnetized ring 51 embedded therein, this ring being preferably magnetized in a direction parallel to its axis. The driven member 52 is mounted on a pivot 53 secured to the upper half 9 of the housing and cooperating with a socket member 54 adjustably held in a bushing 55 secured to the driven member 52, as described in connection with FIGS. 5 and 6, for varying the height of the driven member from the contact surface of the housing member 9.

In this case the magnetic ring 51 cooperates with the driven member 52 to produce a nutating movement thereof about the pivot 53 and a corresponding rotation. This rotation is transmitted by one or more teeth 57 cooperating with a toothed wheel 58 which, in turn, is connected through its shaft 59 with the usual recording or indicating mechanism.

The construction shown in FIG. 7 has the same advantages as those heretofore described in connection with the construction shown in FIGS. 1–6.

In FIGS. 8 and 9 I have illustrated a construction in which the driving member rotates about a fixed axis instead of nutating as in the construction shown in FIGS. 1–7. In FIGS. 8 and 9 the driving member 65 is mounted on a shaft 66 rotatable about a fixed axis. The driving member is made of a magnetic material, and has a portion of its outer surface of greater dimension than the remaining portions, as indicated by the projection 67.

In this construction the fixed member 69 is of nonmagnetic material and is provided with a substantially cylindrical projection or socket 70 within which the driving member rotates.

73 represents a permanent magnet of ring shape and is stationarily mounted on the periphery of the cylindrical projection or socket 70.

75 represents a driven member which is in the form of a ring or cylinder of magnetic material which is of slightly greater internal diameter than the outer surface of the cylindrical projection 70, so that it is free to rotate and nutate about the axis of the cylindrical housing projection 70.

In the operation of this device a magnetic circuit is set up consisting of the permanent magnet 73, the driving member 65 and the driven member 75. The direction of magnetization of the permanent ring 73 is radial to the central axis of the device. This magnetic circuit is unbalanced for the reason that the driving member is not uniform in cross section because of the projections 67. Consequently the magnetic circuit will be stronger when passing through the projections 67, and the driven member will be drawn into contact with the fixed surface at the point nearest to the projections 67 of the driving member. As the driving member rotates, the point or line of contact between the driven member and the fixed surface 69 will follow the projections 67 of the driving member, which produces the desired nutating action of the driven member 75.

Under the same basic idea as in the other figures, namely, the fact that the circular path of contact generated on the driven member is of a different size than the circular path of contact generated on the fixed surface (in this case larger)—the nutation of the driven member will cause the driven member to rotate.

The rotation of the driven member 75 may be transmitted in any suitable manner. For example, in the construction shown, the driven member 75 has a tooth or projection 80. This tooth, during the rotation of the driven member, meshes with a tooth of a gear 81 mounted on a shaft 82 rotatable about a fixed axis. The tooth 80 will of course contact with a tooth of the gear wheel 81 once during the rotation of the driven member, thus resulting in a material reduction of motion from the rotating driving member to the gear 81.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A motion reduction device comprising:
 a nutating driven member having a circular contact portion,
 a stationary pivot on which said driven member is mounted for free nutation and rotation,
 a stationary surface with which said circular contact portion of said driven member contacts during nutation and rotation,
 means for varying the elevation of said pivot relatively to said stationary surface to vary the ratio of revolutions to nutations of said driven member,
 means for imparting nutation to said driven member,
 and means for transmitting rotation of said driven member.

2. A motion reduction device comprising:
 a nutating driven member having a circular contact portion,
 a stationary pivot on which said driven member is mounted for free nutation and rotation,
 a stationary surface with which said circular contact portion of said driven member contacts during nutation and rotation,
 means for varying the elevation of said driven member relatively to said stationary surface to vary the ratio of revolutions to nutations of said driven member,
 means for imparting nutation to said driven member,
 and means for transmitting rotation to said driven member.

3. A motion reduction device comprising:
 a nutating driven member having a circular contact portion mounted for free nutation and rotation,
 a stationary surface on which said circular contact portion rolls while said driven member nutates,
 a moving driving member below said stationary surface,
 means for producing a magnetic circuit between said driven member and said driving member and extending through said stationary surface for imparting nutation to said driven member,
 and means for transmitting rotation of said driven member.

4. A device according to claim 3 in which said magnetic circuit includes permanent magnets as portions of said driving and driven members.

5. A device according to claim 3 in which said magnetic circuit includes a permanent magnet as a portion of one of said driving and driven members,
 and a magnetic element as a portion of the other of said driving and driven members.

6. A device according to claim 3 in which said magnetic circuit includes a stationary permanent magnet mounted to establish a magnetic field through said driven and driving members,
 and magnetic elements as portions of said driven and driving members.

7. A device according to claim 3 in which said moving driving member nutates.

8. A device according to claim 3 in which said moving driving member rotates.

9. A device according to claim 3 in which said driven member is drawn magnetically into contact with said stationary surface.

10. A device according to claim 3 in which the attitude of said driving member relatively to said stationary surface is maintained magnetically.

11. A device according to claim 3 in which the attitude of said driving member relatively to its axis of motion is maintained magnetically.

References Cited

UNITED STATES PATENTS

| 1,495,784 | 5/1924 | Fereday | 310—82 |
| 2,921,468 | 1/1960 | Treff et al. | 310—104 X |

FOREIGN PATENTS

| 3,534 | 1882 | Great Britain. |

DAVID X. SLINEY, *Primary Examiner.*